United States Patent [19]

Serini et al.

[11] Patent Number: 4,482,693

[45] Date of Patent: Nov. 13, 1984

[54] POLYPHOSPHATES AND THE PRODUCTION THEREOF

[75] Inventors: Volker Serini; Paul J. Mayska, both of Krefeld; Hans-Dieter Block, Cologne; Dieter Freitag, Krefeld, all of Fed. Rep. of Germany

[73] Assignee: Bayer Aktiengesellschaft, Leverkusen, Fed. Rep. of Germany

[21] Appl. No.: 528,156

[22] Filed: Aug. 31, 1983

[30] Foreign Application Priority Data

Sep. 10, 1982 [DE] Fed. Rep. of Germany ....... 3233615

[51] Int. Cl.³ .............................................. C08G 79/04
[52] U.S. Cl. .................................... 528/167; 528/168; 528/169; 528/398; 528/400
[58] Field of Search .............................. 528/167–169, 528/398, 400

[56] References Cited

U.S. PATENT DOCUMENTS

| | | | |
|---|---|---|---|
| 3,271,329 | 9/1966 | Coover et al. | 528/167 |
| 4,129,612 | 12/1978 | Serini et al. | 528/196 |
| 4,134,876 | 1/1979 | Horner et al. | 528/167 |
| 4,316,980 | 2/1982 | Idel et al. | 528/199 |
| 4,331,614 | 5/1982 | Schmidt et al. | 528/167 |
| 4,374,971 | 2/1983 | Schmidt et al. | 528/167 |
| 4,415,719 | 11/1983 | Schmidt et al. | 528/167 |
| 4,416,719 | 11/1983 | Horiuchi | 528/167 |

FOREIGN PATENT DOCUMENTS

| | | | |
|---|---|---|---|
| 1037940 | 9/1978 | Canada | 528/167 |
| 1082390 | 7/1980 | Canada | 528/167 |
| 2421977 | 2/1975 | European Pat. Off. | 528/167 |
| 21260 | 1/1981 | European Pat. Off. | 528/167 |
| 2701493 | 7/1977 | Fed. Rep. of Germany | 528/167 |
| 2615038 | 10/1977 | Fed. Rep. of Germany | 528/167 |
| 901665 | 7/1980 | Fed. Rep. of Germany | 528/167 |

*Primary Examiner*—Lester L. Lee
*Attorney, Agent, or Firm*—Connolly and Hutz

[57] ABSTRACT

This invention relates to new polyphosphates, and to the production and use thereof.

3 Claims, No Drawings

POLYPHOSPHATES AND THE PRODUCTION THEREOF

This invention relates to new polyphosphates, and to the production and use thereof.

The new polyphosphates are characterised in that they contain from 0.5 to 100 mol percent of phosphate units corresponding to formulae (I) and/or (II):

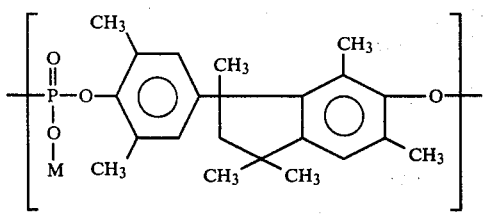

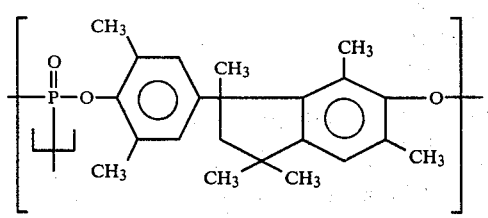

wherein

M represents H, alkali metal like Li, Na, K, ½ alkaline earth metal like Mg, Ca, Ba or Sr, Y or —R—OH, wherein Y represents an alkyl-, cycloalkyl-, aryl- or alkylaryl-radical and —R— represents an o-, m- or p-phenylene radical or a radical of the formula (IIa)

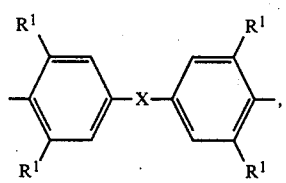

wherein $R^1$ represents H, halogen as chlorine and bromine and $C_1-C_3$ alkyl and X represents a $C_1-C_5$-alkylene- or alkylidene-radical, a $C_3-C_6$-cycloalkylene or cycloalkylidene radical, a single bond, —S— or a radical of the formula (IIb)

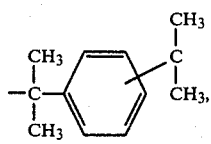

in which the two alkylsubstituents may be in o-, m- or p-position to each other, or represents a radical of the formula (IIc)

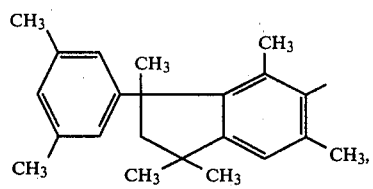

and from 99.5 to 0 mol % of phosphate units corresponding to the formulae (III) and/or (IV):

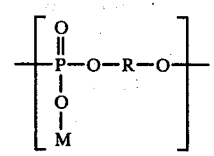

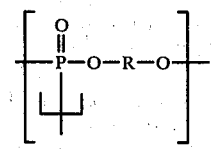

wherein

M is defined as in formula (I), and

R represents an o-, m- or p-phenylene radical or a radical of formula (IIa), but not for a radical of formula (IIc).

The polyphosphates according to the present invention may be produced by a process which is characterised in that from 0.5 to 100 mol % of 1,1,3,4,6-pentamethyl-3-(3,5-dimethyl-4-hydroxyphenyl)-indan-5-ol corresponding to formula (V):

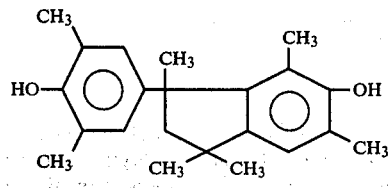

and from 99.5 to 0 mol% hydroquinone, resorcine or of aromatic diols corresponding to the general formula (VI):

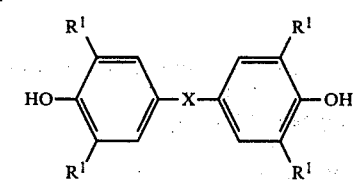

wherein $R^1$ and X have the meaning as given in Formula (IIa) are reacted at from 50° to 350° C. with at least one phosphoric acid ester corresponding to formula (VII):

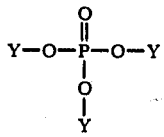

wherein Y represents the same or different organic radicals, which have the meaning as given in formula (I) and (II), using basic alkali metal or alkaline earth metals or compounds thereof and with the release of alcohols and/or phenols.

The polyphosphates produced according to the present process generally have branching points and they generally contain ionic groups.

Aromatic diols corresponding to the formula (VI) include the following, for example:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides, and
α, α'-bis-(4-hydroxyphenyl)-diisopropylbenzenes, These and other suitable aromatic diols corresponding to formula (VI) are described in, for example, U.S. Pat. Nos. 3,028,365; 2,999,835; 3,148,172; 3,271,368; 2,991,273; 3,271,367; 3,780,087; 3,014,891; 2,999,846; in DE-OS Nos. 2,063,050; 2,211,957; 1,570,083; 2,329,585, 2,329,686 and in the monograph by Hermann Schnell, "Chemistry and Physics of Polycarbonates", Polymer Reviews, Volume 9, Interscience Publishers, New York 1964".

Of the aromatic diols corresponding to formula (VI), those corresponding to the following formula (VIII) are preferred:

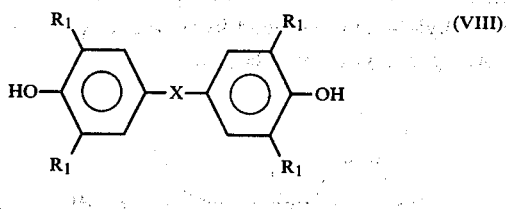

wherein
$R^1$ each independently represents H or $CH_3$, and
X represents a $C_1$–$C_5$ alkylene or alkylidene radical, a $C_5$–$C_6$ cycloalkylene or cycloalkylidene radical, a single bond, —S— or

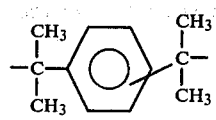

Examples of preferred aromatic diols corresponding to formula (VIII) are as follows:
2,2-bis-(4-hydroxyphenyl)-propane,
2,2-bis-(4-hydroxyphenyl)-butane,
2,4-bis-(4-hydroxyphenyl)-2-methylbutane,
1,1-bis-(4-hydroxyphenyl)-cyclohexane,
bis-(4-hydroxyphenyl),
bis-(4-hydroxyphenyl)-sulphide,
α,α'-bis-(4-hydroxyphenyl)-p-diisopropylbenzene,
2-(3methyl-4-hydroxyphenyl-2-(4-hydroxyphenyl)-propane,
2,2-bis-(3-methyl-4-hydroxyphenyl)-propane,
2-(3,5-dimethyl-4-hydroxyphenyl)-2-(4-hydroxyphenyl)-propane,
2-(3-methyl-4-hydroxyphenyl)-2-(3,5-dimethyl-4-hydroxyphenyl)-propane,
bis-(3,5-dimethylphenyl-4-hydroxyphenyl)methane,
1,1-bis-(3,5-dimethylphenyl-4-hydroxyphenyl)-ethane,
2,2-bis-(3,5-dimethylphenyl-4-hydroxyphenyl)-propane,
2,2-bis-(3,5-dimethylphenyl-4-hydroxyphenyl)-butane,
2,4-bis-(3,5-dimethylphenyl-4-hydroxyphenyl)-2-methyl-butane,
3,3-bis-(3,5-dimethylphenyl-4-hydroxyphenyl)-pentane,
1,1-bis-(3,5-dimethylphenyl-4-hydroxyphenyl)-cyclopentane,
1,1-bis-(3,5-dimethylphenyl-4-hydroxyphenyl)-cyclohexane,
bis-(3,5-dimethylphenyl-4-hydroxyphenyl),
bis-(3,5-dimethylphenyl-4-hydroxyphenyl)-sulphide, and
α,α'-bis-(3,5-dimethylphenyl-4-hydroxyphenyl)-p-diisopropylbenzene.

Preferred aromatic diols corresponding to formula (VIII) are those wherein $R^1$ at least partly represents $CH_3$, but particularly if two methyl groups are in the ortho-position to one phenolic OH group.

Of the aromatic diols corresponding to formula (VIII), those are particularly preferred in which all the substituents $R^1$ represent $CH_3$. Of these in turn, the following aromatic diols are preferred: bis-(3,5-dimethyl-4-hydroxyphenyl)-methane, and 2,2-bis-(3,5-dimethyl-4-hydroxyphenyl)-propane. In turn, the latter is preferred of the two: 2,2-bis-(3,5-dimethyl-4-hydroxyphenyl)-propane.

In the phosphoric acid esters corresponding to formula (III) and (VII), Y represents monovalent organic radicals which may be the same or different. These radicals may represent alkyl radicals, including cycloalkyl, aryl and alkylaryl radicals which may be substituted, for example by halogen. Examples of alkyl groups include the following: methyl, ethyl, propyl, butyl, pentyl, hexyl, heptyl, octyl, nonyl, decyl, undecyl, dodecyl and isomers thereof, for example neopentyl, 3,5,5'-trimethylhexyl, 3-methylhexyl, 2-ethylhexyl, 2,5,5-trimethylhexyl, also cyclohexyl, 2-chloroethyl and 2,3-dibromopropyl.

Examples of aryl and alkylaryl radicals include the following: phenyl, o-, m-, p-methylphenyl, 2,6-dimethylphenyl, 2,4-dimethylphenyl, 2,4,6-trimethylphenyl, diphenyl, 2- and 4-isopropylphenyl, nonylphenyl, 4-tert.-butylphenyl, 2,4,6-trichlorophenyl, 4-chlorophenyl, 4-bromophenyl, 2,4,6-tribromophenyl, naphthyl and benzyl. Of the radicals Y mentioned, the aryl radicals are preferred, particularly the halogen-free radicals. Of these, the phenyl, the o-, m-, p-methylphenyl and the 2,6-dimethylphenyl radicals in turn are particularly preferred.

Phosphoric acid esters corresponding to formula (VII) include the following, for example:
bis-(phenyl)-methylphosphate,
bis-(ethyl)-phenylphosphate,
bis-(ethyl)-2,6-dimethylphenylphosphate,
bis-(phenyl)-ethylphosphate,
tris-(2-chloroethyl)phosphate,
bis-(phenyl)-2-chloroethylphosphate,
bis-(butyl)-phenylphosphate,
bis-(phenyl)butylphosphate,
bis-(neopentyl)-phenylphosphate, bis-(4-methylphenyl)-2-ethylhexylphosphate,
bis-(2-ethylhexyl)-phenylphosphate,
bis-(2-ethylhexyl)-4-methylphenylphosphate,
bis-(phenyl)-2-ethylhexylphosphate,
tris-(octyl)-phosphate,
bis-(phenyl)-octylphosphate,
bis-(octyl)-phenylphosphate,
bis-(3,5,5-trimethylhexyl)-phenylphosphate,
bis-(2,5,5-trimethylhexyl)-4-methylphenylphosphate,
bis-(phenyl)-isodecylphosphate,
bis-(dodecyl)-4-methylphenylphosphate,
bis-(dodecyl)-phenylphosphate,
tris-(phenyl)-phosphate,
tris-(2-methylphenyl)-phosphate,
tris-(4-methylphenyl)-phosphate,
bis-(2-methylphenyl)-phenylphosphate,
bis-(4-methylphenyl)-phenylphosphate,
bis-(phenyl)-2-methylphenylphosphate,
bis-(phenyl)-4-methylphenylphosphate,
tris-(isopropylphenyl)-phosphate,
bis-(isopropylphenyl)-phenylphosphate,
bis-(phenyl)-isopropylphenylphosphate,
tris-(nonylphenyl)-phosphate,
tris-(2,6-dimethylphenyl)phosphate,
bis-(2,6-dimethylphenyl)-phenylphosphate,
bis-(phenyl)-2,6-dimethylphenylphosphate,
bis-(2,6-dimethylphenyl)-4-tert.-butylphenylphosphate,
bis-(2,6-dimethylphenyl)-4-methylphenylphosphate,
bis-(2,6-dimethylphenyl)-3-methylphenylphosphate,
bis-(2,6-dimethylphenyl)-4-isopropylphenylphosphate, and
bis-(2,6-dimethylphenyl)-2-isopropylphenylphosphate.

Triaryl esters are preferred phosphoric acid esters corresponding to formula (VII). Phosphoric acid esters corresponding to formula (VII) which are particularly preferred are triaryl esters having three identical aryl radicals or having at least two 2,6-dimethylphenyl radicals, for example:
tris-(phenyl)-phosphate,
tris-(2-methylphenyl)-phosphate,
tris-(4-methylphenyl)-phosphate,
tris-(isopropylphenyl)-phosphate,
tris-(2,6-dimethylphenyl)-phosphate,
bis-(2,6-dimethylphenyl)-phenylphosphate,
bis-(2,6-dimethylphenyl)-2-methylphenylphosphate,
bis-(2,6-dimethylphenyl)-4-methylphenylphosphate, and
bis-(2,6-dimethylphenyl)-isopropylphenylphosphate.

Triaryl esters which are particularly preferred are triphenylphosphate and tri-(2,6-dimethylphenyl)-phosphate.

Basic alkali metal and alkaline earth metal compounds are used according to the present invention as catalysts. They may be of an organic or inorganic nature. Such compounds include the following, for example: metals, for example Li, Na, Ca; hydrides, for example LiH, NaH, KH, CaH$_2$: oxides, for example Li$_2$O, Na$_2$O, K$_2$O, CaO, BaO; hydroxides, for example LiOH, NaOH, KOH, Ba(OH)$_2$, Sr(OH)$_2$, Ca(OH)$_2$; alkali metal borohydrides, for example NaBH$_4$; amides of alkali metals, for example Li-, Na- and K-amide; alkali metal and alkaline earth metal alcoholates, for example methylates, ethylates, propylates, butylates, cyclohexanolates of Li, Na, K or Ca; phenolates, for example the Li-, Na- and K-salts of phenol, of o-, m-, p-cresol, or of 2,6-dimethylphenol; bis-alkali metal salts of aromatic dihydroxy compounds, e.g. the Li-, Na- and K-salts of 2,2-bis-(4-hydroxyphenyl)-propane, or of 2,2-bis-(3,5-dimethyl-4-hydroxyphenyl)-propane.

The alkali metal compounds are preferred, and of these, the Na and K compounds are preferred. The hydroxides, alcoholates, phenolates and bisphenolates are particularly preferred. Na-phenolate is more particularly preferred.

The reaction according to the present invention, of the aromatic diols with the phosphoric acid esters is generally carried out as follows. The phosphoric acid ester is introduced and melted if it is not already liquid. The aromatic diol is added to the phosphoric acid ester and is dissolved with heating. The catalyst is then added. The release of alcohol or phenol then commences under an elevated temperature. The alcohol or phenol which is released is distilled off and the resulting polyphosphate is obtained as a residue.

The process is carried out analogously if several aromatic diols or several phosphoric acid esters are used. The addition sequence of the starting components may differ from that described above. Solubility of the components in each other is also not strictly necessary for the reaction, even if it is favourable. The time of addition of the catalyst after the starting components have been melted is not critical. The catalyst may also be added before or during the melting operation of the starting components. It may be useful to subsequently add catalyst during the reaction to maintain an adequate reaction rate. The catalyst does not need to be dissolved, or does not need to be completely dissolved in the reaction mixture, although this may be favourable for the reaction and for the quality of the product which is obtained.

The starting components are generally melted at a temperature of from 50° to 300° C., preferably at from 100° to 250° C. and more preferably from 125° to 225° C.

The catalyst is preferably added after the starting components have been melted. It is particularly favourable for the start and the continuation of the reaction if the catalyst is added at from 100° to 250° C., preferably at from 125° to 225° C.

The reaction temperature is maintained as low as possible, and it is generally from 100° to 350° C., preferably from 125° to 300° C. and more preferably from 150° to 250° C.

The reaction temperature in the initial phase in which most of the alcohol or phenol (about 90%) is eliminated, is as low as possible, preferably from 100° to 250° C., and more preferably from 125° to 225° C.

Polycondensation advantageously takes place under reduced pressure, because as a result of this, the quantity of alcohol or phenol which is released is quickly removed from the reaction mixture.

The process is generally carried out under pressures of from 600 to 0.01 mm Hg, preferably under pressures of from 400 to 0.025 mm Hg, and more preferably under pressures of from 250 to 0.05 mm Hg.

Whereas most of the alcohol or phenol (about 90%) is generally eliminated under 600 to 10 mm Hg, the remaining quantities are mostly distilled off under 10 to 0.1 mm Hg.

A pressure balance which may become necessary is generally achieved using inert gas, for example CO$_2$ or N$_2$, so that atmospheric oxygen is kept away as far as possible from the reaction medium.

The reactants are also generally melted under inert gas.

The residual content of released alcohol or phenol in the reaction product is generally less than 2%, preferably less than 1%, more preferably less than 0.5% and most preferably less than 0.1%, (based on the branched ionomeric polyphosphate which is obtained).

During the reaction of the aromatic diols corresponding to formulae (V) and (VI) with phosphates, from 1.0 to 0.0001, preferably from 0.5 to 0.0005, and more preferably from 0.05 to 0.0005 moles of alkali metal or alkaline earth metal/mol of phosphate are generally used.

When large quantities of alkali or alkaline earth metal are used, it is advantageous to begin the polycondensation at a particularly low temperature and under only a slightly reduced pressure owing to the faster release rate of the alcohol or phenol.

During the production of the polyphosphates according to the present process, the aromatic diols and the monomeric phosphates are generally used in a molar ratio of from 0.66:1 to 2.3:1. Ratios of from 0.66:1 to 0.96:1 and from 2.3:1 to 1.6:1 are preferred, while ratios of from 0.75:1 to 0.96:1 and from 2.2:1 to 1.6:1 are particularly preferred, and ratios of from 0.8:1 to 0.92:1 and from 2.1:1 to 1.7:1 are most particularly preferred.

The polyphosphates produced according to the present process contain polymer units corresponding to formulae (IX) and/or (X) and optionally (XI), and they contain branching points corresponding to formula (XII):

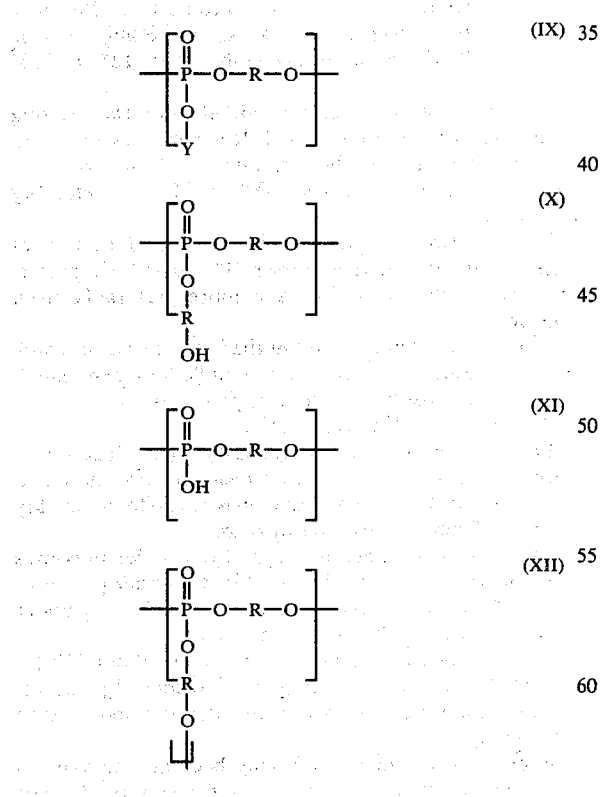

and end groups corresponding to the formulae (XIII), (XIV), (XV) and optionally corresponding to the formulae (XVI), (XVII) and (XVIII):

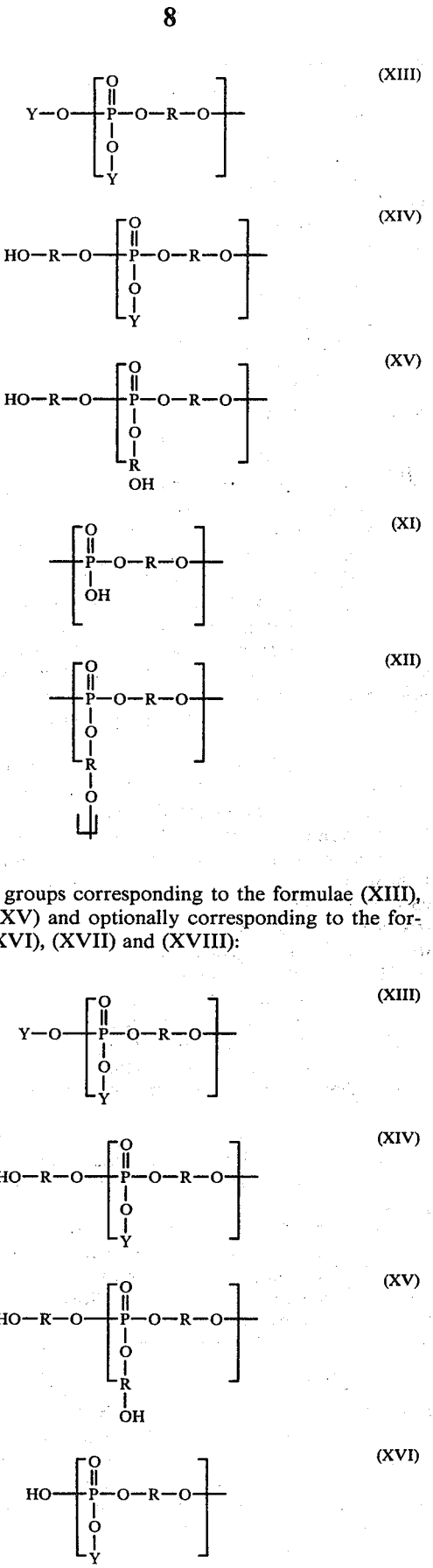

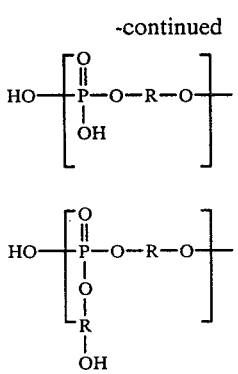

(XVII), (XVIII)

In formulae (IX) to (XVIII), Y and R are as defined in formula (I).

The polymer units of formula (XI) and the end groups of formulae (XVI), (XVII) and (XVIII) may be present if, for example, alkali metal hydroxides are used as catalysts or if moisture is not excluded or, in special cases, if small quantities of H$_2$O are added.

The polyphosphates produced according to the present process contain ionic groups such as —O$^\ominus$Me$^\oplus$ or $^\ominus$O Me$^{\oplus\oplus}$$^\ominus$O—. These groups can be formed by the reaction of terminal —OH— groups with basic compounds, e.g. by reaction with the alkali compound used as catalyst. These groups are salts like —O$^\ominus$M$^\oplus$, —O$^\ominus$ ½M$^{\oplus\oplus}$.

Me$^\oplus$ represents, for example, alkali metal ions, such as Li$^\oplus$, Na$^\oplus$ or K$^\oplus$ and Me$^{\oplus\oplus}$ represents, for example, alkaline earth metal ions, such as Ca$^{\oplus\oplus}$ or Ba$^{\oplus\oplus}$.

The quantity of these ionic groups depends on the quantity of catalyst which is used.

Ionic polyphosphates are generally preferred which contain ionic groups corresponding to the quantity of catalyst which is preferably used.

In particular cases, it may be desirable to bring the content of ionic groups to a particularly high or a particularly low level. In the first case, particularly large quantities of catalyst are used during polycondensation, and in the second case, particularly low quantities of catalyst are used. In the second case, the content of ionogenic groups may also be reduced to the required level by adding base-binding substances. Such base-binding substances include, for example, dialkyl sulphates, such as dimethyl sulphate, or diethyl sulphate, or organic acids, such as toluene sulphonic acid.

The base-binding substances are generally introduced into the polymer melt in the required quantity towards the end of the polycondensation reaction. Thereafter, the reaction conditions are still maintained for some time to ensure a reaction of the polyphosphates with the base-binding substances.

In the present process, the structural units in the polyphosphate may be varied by varying the molar ratios of aromatic diol: phosphate. This may be significant for the respective purpose of use. Thus, for example, in the case of molar ratios of aromatic diol:phosphate of 0.66:1–1.49:1, the structural units corresponding to formulae (IX) and (XIII) generally predominate with respect to the structural units corresponding to formulae (XI) and (XV), whereas in the case of molar ratios of aromatic diol/phosphate of 1.51–2.3:1, the structural units corresponding to formulae (X) and (XV) predominate with respect to the structural units corresponding to formulae (IX) and (XIII).

In the case of the preferred molar ratios of aromatic diol:phosphate of 0.66:1–0.96:1, practically only structural units corresponding to formulae (IX) and (XIII) of the structural units corresponding to formulae (IX), (X), (XIII), (XIV), and (XV) may be contained in the polyphosphate of the present invention, and in the case of the preferred molar ratios of aromatic diol:phosphate of from 2.5:1 to 2.03:1, practically only structural units corresponding to formulae (X) and (XV) may be contained in the polyphosphate of the present invention.

In the first case, this means that there are practically no phenolic OH groups of aromatic diol in the polyphosphate of the present invention (for example ≦0.2 mol %, preferably ≦0.1 mol % of phenolic OH of aromatic diol).

In the second case, this means that there are practically all of phenolic groups of aromatic diol in the polyphosphate of the present invention.

The polycondensation may be followed by continuously measuring the melt viscosity of the reaction medium.

The polyphosphates of claim 1 according to the present invention may be obtained by the present process of polyphosphate production, but they may also be obtained by other processes known hiterto. Such known processes include the following, for example:

(1) reaction of the aromatic diols with dechloroalkyl phosphates or dichloroaryl phosphates with anhydrous metal halides or with metals as catalyst, as described in, for example, M. Sander and E. Steiniger, J. Macromol., Sci. (Revs.) C 1 (1), 99–100 (1967).

(2) Reaction of the aromatic diols with dichloroalkyl phosphates or dichloroaryl phosphates with catalysts, as mentioned under (1) but in organic solvents.

(3) Reaction of the aromatic diols with dichloroalkyl phosphates or dichloroaryl phosphates in organic solvents with amines as catalysts and acid acceptors, as described in the literature mentioned under (1).

(4) Reaction of the aromatic diols with phosphorus oxychloride and phenols in the presence of metals or anhydrous metal halides, as described in DE-OS No. 2,701,493.

The process of the present invention is preferred for the production of the polyphosphates according to the present invention for the reasons mentioned in the following. Likewise, the branched, polyphosphates produced according to the present process are preferred for the reasons mentioned in the following to those polyphosphates which are produced according to known processes.

Problems arise during the phosphate production in the known processes (1) to (4). Most of the problems of these processes correspond to the problems of the process mentioned under (4) which is described in DE-OS No. 2,701,493. For this reason, this process will initially be compared in the following with the present process, and the polyphosphates which may be obtained according to these two processes will also be compared.

DE-OS No. 2,701,493 describes a process for the production of polyphosphates. This process comprises two steps, in which in the first step, phosphorus oxychloride is reacted with bisphenol, and in the second step, the reaction product of the first step is reacted with phenol in the presence of anhydrous alkali metal halides, for example LiCl, at a temperature of up to about 300° C. During this reaction, HCl is split off with the formation of oligormeric products and it is removed from the reaction product. Furthermore, excess phosphorus oxychloride and excess phenol are distilled off. The end products still contain residual chlorine from the phosphorus oxychloride and the inorganic chlorides used as catalysts.

In the process according to the present invention, the starting materials are easier to handle, because inert phosphoric acid esters may be used instead of the aggressive phosphorus oxychloride.

Moreover, the present process is a simple one-step process, whereas the process of DE-OS No. 2,701,493 is preferably to be carried out in two steps, which necessitates an increased commercial expense.

The process according to the present invention may be advantageously carried out in conventional steel boilers, since no corrosion problems occur. However, the process of DE-OS No. 2,701,493 requires expensive glass or enamel apparatus due to the risk of corrosion caused by the phosphorus oxychloride which is used and by evolving HCl gas. In addition thereto, the process of DE-OS No. 2,701,493 has the disadvantage compared to our process that a considerable decomposition of the bisphenol into strongly coloured by-products generally occurs at the high reaction temperature owing to the evolving HCl gas.

The present process for the production of branched, ionogenic polyphosphates also has an advantage over DOS No. 2,701,493 in that high molecular weight products may be obtained, without cross-linking occurring. This is particularly the case when greater quantities of aromatic diols corresponding to the formulae (VIII and R=CH$_3$) are used.

The polyphosphates according to the present invention which may be obtained according to the new process which we are claiming have advantages over the polyphosphates produced according to processes known hitherto (for example DE-OS No. 2,701,493). Thus, they do not contain any HCl or hydrochloric acid, which cannot be avoided in the case of polyphosphates which are obtained from the starting components as a result of the release of HCl. They do not result in corrosion during thermoplastic processing on processing machines, for example extruders, rollers or kneaders and in moulds. Corrosion is also avoided when in contact with other metal parts, for example when used in the electronics sector.

Furthermore, the polyphosphates which may be obtained according to our process do not contain any radicals of chlorine bound to phosphorus. Such radicals of chlorine bound to phosphorus also result in corrosive damage during processing or use. The metal halide contents of such polyphosphates may also cause corrosive damage, in particular in processing machines at elevated temperature. Owing to the absence of residual HCl contents, of chlorine bound to phosphorus and of metal halides, the branched, ionogenic polyphosphates which may be obtained according to our new process also behave in an extremely advantageous manner when mixed with many other polymers, because they do not cause a decomposition in such other polymers, unlike known polyphosphates, for example those of DE-OS No. 2,701,493.

Furthermore, some good properties of the polyphosphates according to the present invention are particularly pronounced when they are produced according to the present process, for example the adhesion to various materials mentioned later on, the low electrostatic charging ability, the printing ability and the processing stability in admixture with other polymers and additives.

Practically the same disadvantages as in the above-mentioned process (4), described in DE-OS No. 2,701,493, and in the polyphosphates which may be obtained by that process, arise in the above-mentioned process (1), (2) and (3). The processes (2) and (3) also have the disadvantage of requiring the use of solvents which are also difficult to remove quantitatively from the polyphosphates. Amines are also necessary in process (3). Moreover, it is difficult to free the polyphosphates produced according to (3) from the alkyl ammonium salts which are produced during the reaction.

It was surprising that 1,1,3,4,6-pentamethyl-3-(3,5-dimethyl-4-hydroxyphenyl)-indan-5-ol may be reacted to produce polyphosphates. The property combinations of these phosphates open up a number of uses, for which polyphosphates known hitherto could not be used.

The polyphosphates according to the present invention, in particular the branched, ionogenic polyphosphates produced according to the present process, are polymers which have commercially advantageous properties. They contain from 0.5 to 100 mol %, preferably from 60 to 100 mol % or from 1 to 40 mol %, more preferably from 80 to 100 mol % or from 2 to 15 mol %, and most particularly 100 mol % of the diols of the formulae (I) and/or (II).

They may be viscous or more or less plastic resins at 20° C. They then have glass transition temperatures of below 20° C. They are preferably rigid thermoplastic resins which have glass transition temperatures $T_g$ of above 20° C. Those resins having glass transition temperatures $T_g$ of above 40° C. are particularly preferred, whereas those which have glass transition temperatures of above 70° C., in particular above 100° C., are most particularly preferred.

The polyphosphates of this invention have apparent molecular weights $\overline{M}_W$, (measured by gel chromatography, with BPA polycarbonate as control) of from 1600 to 150 000, preferably from 23 000 to 50 000, more preferably from 3200 to 25 000 and most preferably from 5 000 to 20 000.

The average polycondensation degrees $\overline{P}$ of the polyphosphates generally range from 3 to 30, based on phosphorus groups in the polyphosphate. Polycondensation degrees $\overline{P}$ of from 4 to 25 are preferred, and degrees of from 7 to 20 are particularly preferred.

The relative viscosity of the present polyphosphates generally ranges from 1.01 to 1.20, preferably from 1.02 to 1.18, and more preferably from 1.03 to 1.15 (measured in CH$_2$Cl$_2$, c=0.5 g/l).

The present invention also includes the use of the the polyphosphates.

The polyphosphates of the present invention have high glass transition temperatures and high thermal stabilities. They may be processed at relatively low temperatures, because the melt viscosity is low. The following properties are also advantageous: their relatively high structural viscosity of the melts, the high temperature stability and the good processing stability. They have a good creep resistance, and they are also only slightly sensitive to hydrolytic influences, for example to aqueous acids and alkalis, to ammonia and amines. Their solubility, particularly in lacquer solvents, is considerable. Coatings of these phosphates may be cross-linked by stoving or irradiation and they are effectively graftable (for example radically). Moreover, they are flame-resistant, i.e. they hardly burn upon introduction into a flame, and exhibit a good adhesion to various materials, such as glass, metal and wood.

Furthermore, the polyphosphates of the present invention exhibit a good metal adhesion, a low electrostatic charging ability and a good printing ability, even in admixture with other polymers.

The polyphosphates of this invention are particularly well suited as additives to other polymers. The polyphosphates which have comparatively high glass transition temperatures are particularly favourable. They are favourable for storage and transport, because they hardly exhibit any tendency towards caking. They are also suitable as mixture components with other polymers, because at the most they only slightly reduce the thermal stability of the mixtures.

The polyphosphates of the present invention, even when added in small quantities to other polymers, cause an increase in the flame resistance, optionally in the presence of other additives, such as halogen compounds and metal oxides, and also cause an increase in the flowability, a stabilization with respect to discolouration and polymer decomposition (for example caused by heat and oxygen influences or hydrolysis) and cause an increase in processing stability.

The present polyphosphates may be used for a wide variety of purposes, for duroplasts and also for thermoplasts. They may be used on their own as adhesives and cements and for coatings or mouldings, in which cases their good adhesion to different materials, for example glass, metal and wood, their flame resistance, their low melt viscosity and their hydrolysis stability are advantageous thereto.

Thermoplasts which may advantageously be modified by the polyphosphates of this invention are, for example, homo- and copolymers of styrene and derivatives thereof, of acryl and methacryl compounds, of maleic acid anhydride and of vinyl chloride, and rubber-modified variants thereof. Such homo- and copolymers include the following, for example: polystyrene, styrene-acrylonitrile copolymer, α-methyl styrene-acrylonitrile copolymer, styrene-maleic acid anhydride copolymer styrene-acrylonitrile-maleic acid anhydride copolymer, polymethylmethacrylate, styrene-methylmethacrylate copolymer, styrene-acrylonitrile-methylmethacrylate copolymer and polyvinyl chloride. Rubber-modified variants of such polymers include, for example, ABS polymers and HIPS polymers. Other thermoplasts which may be modified using the polyphosphates of the present invention include the following, for example: polyamides, cellulose esters, aromatic-aliphatic polyesters, such as polyethylene- and polybutylene terephthalate, aromatic polyesters, aromatic polycarbonates, polysulphones, polyethersulphones and in particular polyphenylene ether and mixtures thereof with homo- or copolymers of styrene, such as mixtures of poly-(2,6-dimethyl-p-phenylene oxide) and rubber-modified polystyrene, such as HIPS.

Duroplasts may also be advantageously modified by the branched inonomeric polyphosphates of the present invention. The polyphosphates are admixed before hardening with the duromers, for example phenol resins, polyurethane systems, melamine resins, epoxy resins, unsaturated polyester resins and other cross-linking polymers.

EXAMPLES

Example 1

Production of a polyphosphate from 1,1,3,4,6-pentamethyl-3-(3,5-dimethyl-4-hydroxyphenyl)-indan-5ol and triphenylphosphate.

326.1 g (1 mol) of triphenylphosphate are melted in a stirrer-equipped flask, and heated to 200° C. 292.1 g (0.9 mols) of 1,1,3,4,6-pentamethyl-3-(3,5-dimethyl-4-hydroxyphenyl-indan-5ol are then added and dissolved. 116.1 g (0.02 mols) of Na-phenolate are added and also dissolved. The pressure is then slowly reduced to 200 mm Hg at 200° C. and the phenol which is released is distilled off. When the release of phenol subsides, the pressure is then slowly further lowered to 0.2 mm Hg and more phenol is drawn off. After this pressure reduction, the mixture is maintained for a further 30 minutes at 220° C. and under 0.2 mm Hg, and the remaining phenol is drawn off. During the melting procedure and during condensation, the mixture is maintained under $N_2$ and stirred. Polyphosphate remains as a residue which solidifies on cooling into a rigid, solid polymer. The properties of this polymer are given in Table 1.

Examples 2 to 7

Production of other polyphosphates from different aromatic diols.

Other polyphosphates were produced (Examples 2 to 7) according to the directions to Example 1, but different starting materials were used, as stated in Table 1. Properties of the polyphosphates which were obtained are given in Table 1.

TABLE 1

| | | | Production of polyphosphates | | | | | |
|---|---|---|---|---|---|---|---|---|
| Ex. | Aromatic diols used (Molar ratio) | Molar ratio of arom. diols: TPP | Catalyst Na—phenolate (Mol/Mol TPP) | Polyphosphate | | | | |
| | | | | Consistency | colour | $\eta$rel | $\overline{M}_w$ | $T_g$ (°C.) |
| 1 | INDAN | 0.90:1 | 0.015 | Rigid | Colourless | 1.08 | 15200 | 123 |
| 2 | INDAN | 1.05:1 | 0.020 | Rigid | light yellow | 1.10 | 17600 | 139 |
| 3 | INDAN | 1.75:1 | 0.015 | Rigid | light yellow | 1.05 | 8300 | 145 |
| 4 | INDAN/BPA 65/35 | 0.90:1 | 0.010 | Rigid | Colourless | 1.08 | 14500 | 89 |
| 5 | INDAN/TMBPA 65/35 | 0.90:1 | 0.020 | Rigid | light yellow | 1.08 | 15700 | 108 |
| 6 | INDAN/TMBPA 15/85 | 0.90:1 | 0.015 | Rigid | light yellow | 1.09 | 17200 | 91 |
| 7 | INDAN/TMBPF 65/35 | 0.90:1 | 0.015 | Rigid | Colour- | 1.07 | 13800 | 104 |

TABLE 1-continued

| | | Production of polyphosphates | | | | | |
|---|---|---|---|---|---|---|---|
| Ex. | Aromatic diols used (Molar ratio) | Molar ratio of arom. diols: TPP | Catalyst Na—phenolate (Mol/Mol TPP) | Polyphosphate | | | |
| | | | | Consistency colour | $\eta rel$ | $\overline{M}_w$ | $T_g$ (°C.) |
| | | | | less | | | |

INDAN = 1,1,3,4,6-pentamethyl-3-(3,5-dimethyl-4-hydroxyphenyl)-indan-5-ol
BPA = 2,2-bis-(4-hydroxyphenyl)-propane
TMBPA = 2,2-bis-(3,5-dimethyl-4-hydroxyphenyl)-propane
TMBPF = bis-(3,5-dimethyl-4-hydroxyphenyl)-methane
TPP = trisphenylphosphate
$\eta rel$ = measured in $CH_2Cl_2$, c = 5·g/l
$\overline{M}_w$ = apparent weight average molecular weight measured by gel chromatography, with BPA -polycarbonate as control
$T_g$ = glass transition temperature measured by differential thermoanalysis

Example 8

Production of a polyphosphate from 1,1,3,4,6-pentamethyl-3-(3,5-dimethyl-4-hydroxyphenyl)-indan-5-Ol (INDAN) and dichlorophenylphosphate 48.7 g (0.15 mols) of INDAN, 0.34 g of anhydrous $AlCl_3$ and 31.7 g (0.15 mols) of dichlorophenylphosphate are reacted together under $N_2$ and with stirring at from 75° to 175° C. After the release of HCl and after drawing off the HCl gas, a viscous melt is obtained which solidifies, on cooling, into a yellowish brown brittle resin.

Analytical data of the polyphosphate:
$\eta rel$ (see Table): 1.035
$\overline{M}_w$ (see Table): 4200
$T_g$ (see Table): 105° C.

We claim:

1. Polyphosphates, characterised in that they contain from 0.5 to 100 mol % of phosphate units corresponding to formulae (I) and/or (II):

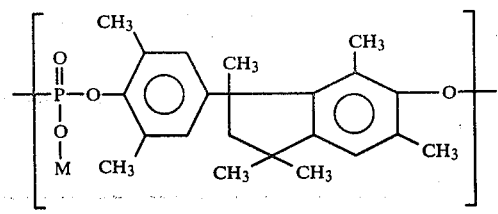   (I)

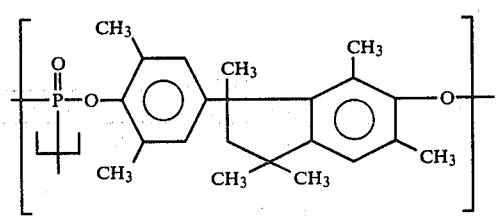   (II)

wherein
M represents H, alkali metal, ½ alkaline earth metal, Y or —R—OH, wherein
 Y represents an alkyl-, cycloalkyl-, aryl- or alkylaryl- radical and
 —R— represents an o-, m- or p-phenylene radical or a radical of the formula (IIa)

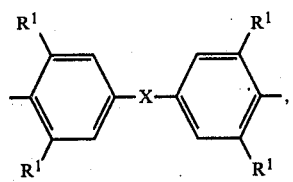   (IIa)

wherein
$R^1$ represents H, halogen as chlorine and bromine and $C_1$-$C_3$ alkyl and
X represents a $C_1$-$C_5$-alkylene- or alkylidene-radical, a $C_3$-$C_6$-cycloalkylene or cycloalkylidene radical, a single bond, —S— or a radical of the formula (IIb)

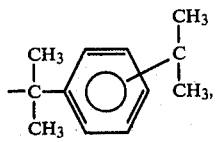   (IIb)

in which the two alkylsubstituents may be in o-, m- or p-position to each other, or represents a radical of the formula (IIc)

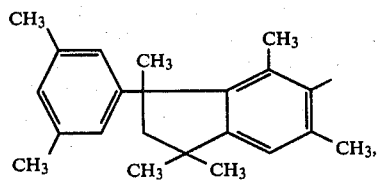   (IIc)

and from 99.5 to 0 mol % of phosphate units corresponding to formulae (III) and/or (IV):

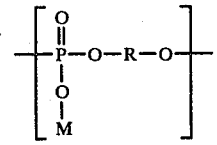   (III)

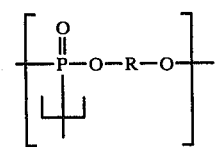   (IV)

wherein

M is as defined in formula (I), and

R represents an o-, m- or p-phenylene radical or a radical of formula (IA), but not a radical of formula (IIc).

2. A process for the production of polyphosphates according to claim 1 which comprises reacting from 0.5 to 100 mol % of 1,1,3,4,6-pentamethyl-3-(3,5-dimethyl-4-hydroxyphenyl)-indan-5-ol of the formula

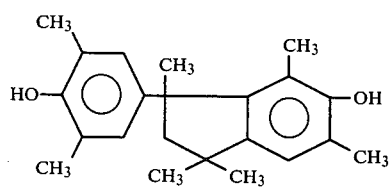

and from 99.5 to 0 mol % hydroquinone, resorcine or of aromatic diols corresponding to the formula

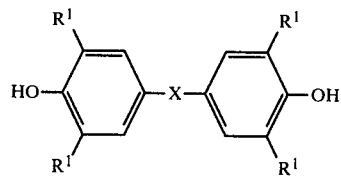

wherein $R^1$ and X have the meaning as in formula (IIa)

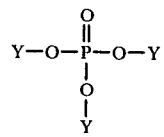

at from 50°–350° C. in the presence of basic alkali metal or alkaline earth metal compounds wherein Y represents the same or different organic radicals, which have the meaning as given in formulae (I) and (II).

3. Polyphosphates obtained according to the process of claim 2.

* * * * *